United States Patent [19]
Doran

[11] Patent Number: 4,962,987
[45] Date of Patent: Oct. 16, 1990

[54] OPTICAL DEVICE PRODUCING AN INTENSITY DEPENDENT PHASE SHIFT

[75] Inventor: Nicholas J. Doran, Cambridge, England

[73] Assignee: British Telecommunications public limited company, London, England

[21] Appl. No.: 209,479
[22] PCT Filed: Oct. 20, 1987
[86] PCT No.: PCT/GB87/00739
  § 371 Date: Jun. 20, 1988
  § 102(e) Date: Jun. 20, 1988
[87] PCT Pub. No.: WO88/02875
  PCT Pub. Date: Apr. 21, 1988

[30] Foreign Application Priority Data
  Oct. 20, 1986 [GB] United Kingdom ............... 8625088
  Oct. 22, 1986 [GB] United Kingdom ............... 8625281
  Jul. 22, 1987 [GB] United Kingdom ............... 8717376

[51] Int. Cl.$^5$ .............................. G02B 6/26
[52] U.S. Cl. ........................ 350/96.15; 350/96.16; 350/96.29
[58] Field of Search ............ 350/96.12, 96.13, 96.14, 350/96.15, 96.16, 96.29, 96.30, 96.31, 96.34; 356/349, 350, 351

[56] References Cited

U.S. PATENT DOCUMENTS

| | | | |
|---|---|---|---|
| 3,558,213 | 1/1971 | Marcatili | 350/96.12 |
| 3,589,794 | 6/1971 | Marcatili | 350/96.1 |
| 4,456,377 | 6/1984 | Shaw et al. | 356/350 |
| 4,558,921 | 12/1985 | Hasegawa et al. | 350/96.29 |
| 4,632,518 | 12/1986 | Jensen | 350/385 |
| 4,633,524 | 12/1986 | Hasegawa | 455/612 |
| 4,635,263 | 1/1987 | Mollenauer | 372/3 |
| 4,637,722 | 1/1987 | Kim | 356/350 |
| 4,687,330 | 8/1987 | Lefevre | 356/350 |
| 4,699,452 | 10/1987 | Mollenauer et al. | 350/96.16 |
| 4,700,339 | 10/1987 | Gordon et al. | 370/3 |
| 4,707,136 | 11/1987 | Kim | 356/350 |
| 4,741,587 | 5/1988 | Jewell et al. | 350/96.15 |
| 4,749,248 | 6/1988 | Aberson, Jr. et al. | 350/96.19 |
| 4,839,898 | 6/1989 | Payne et al. | 350/96.15 X |

OTHER PUBLICATIONS

"The Soliton Lawer", L. F. Mollenauer and R. H. Stolen, Bell Laboratories, Holmdel, N.J. 07733, *Optics Letters,* Jan. 1984, vol. 9, No. 1, pp. 13–14.
"Nonlinear Antiresonant Ring Interferometer", Optics Letters, Otsuka, pp. 471–473 (Sep. 1983).
"Optical Kerr Effect in Fiber Gyroscopes: Effects of Nonmonochromatic Sources", Optics Letters, Frigo et al, pp. 119–121 (Feb. 1983).
"Solitons in Optical Communications", IEEE Journal of Quantum Electronics, vol. QE-19, No. 12, Dec. 1983, Doran et al.
"Optical Multistability in a Fiber-Optic Passive-Loop Resonator", Optics Communications, vol. 59, No. 4, Sep. 1986, Crosignani et al.
"Digital Optical Logic Using a Pulsed Sagnac Interferometer Switch", Optical Engineering, vol. 25, No. 1, Jan. 1986, Eichmann et al.
"Proposal for a New All-Optical Waveguide Functional Device", Optics Letters, vol. 10, No. 8, Aug. 1985, Kawaguchi, pp. 411–413.

*Primary Examiner*—John D. Lee
*Attorney, Agent, or Firm*—Nixon & Vanderhye

[57] ABSTRACT

An optical device comprises an optical waveguide (2) formed from at least a first material having a non-linear refractive index $n_2$ coupled to a first pair of ports (4,5) of an optical coupler (3). An optical signal input at one of the second pair of ports (6,7) of the coupler (3) is split to provide two signals counter propagating around the waveguide loop (2). By selecting the coupling ratio and appropriate waveguide parameters to ensure an asymmetry in the device it is possible to produce an intensity dependent relative phase shift between the counter propagating signals, thereby to vary the device output. Embodiments of the invention may be used to perform logic functions on, to amplify, switch or otherwise modify an input signal.

14 Claims, 3 Drawing Sheets

OPTICAL DEVICE PRODUCING AN INTENSITY DEPENDENT PHASE SHIFT

FIELD OF THE INVENTION

The invention relates to an optical device for use for example as an optical amplifier or logic element.

BACKGROUND AND SUMMARY OF THE INVENTION

A paper entitled "Nonlinear antiresonant ring interferometer" in Optics Letters, Vol. 8, No. 9, pages 471-473, by Kenju Otsuka, describes an interferometer comprising a beam splitter to split an optical beam into portions of different intensities, a pair of mirrors on to respective ones of which the portions impinge, and a block of non-linear material positioned in the optical path between the mirrors. Light is split at the beam splitter into the different intensity portions which are then caused to pass in opposite directions through the non-linear medium which has the effect of imparting different phase shifts on the light portions due to its non-linear refractive index property. The phase shifted portions are recombined at the beam splitter.

The Otsuka device relies on cross-interaction between the two counter propagating optical fields and is dependent on interference between the fields producing a non-linear index grating within the non-linear medium. In these circumstances the counter propagating fields in the device are necessarily of a duration which exceeds the propagation period within the non-linear medium. The device operation requires the optical fields to be coincident in the non-linear medium thereby necessitating precise location of the non-linear medium at the mid-point of the optical path around the device. One of the problems with this device is therefore the need for accurate positioning of the various components. For example, the mirrors also have to be very accurately aligned with the non-linear medium and with each other.

In addition, to avoid problems which would arise from field divergence within an extended non-guiding medium, the length of the non-linear medium itself is restricted. There is a further risk of diffraction problems because the optical fields are laterally unconstrained during propagation around the device i.e.. the fields could spread out laterally which would reduce their intensities.

It is an object of the present invention to provide an optical device which substantially overcomes or at least mitigates the aforementioned problems and restrictions. It is a further object of the present invention to provide a method of operation of such a device.

In a first aspect the present invention provides an optical device comprising a coupling means having first and second pairs of optical communication ports, in which portions of an optical signal received at a port of one pair are coupled into each port of the other pair in a predetermined coupling ratio; and an optical waveguide at least a portion of which includes a first material having a non-linear refractive index, the optical waveguide coupling together the first pair of ports; the coupling ratio and appropriate waveguide parameters being selected such that in use the portions of an optical signal at a working intensity received at one of the second pair of ports of the coupling means and coupled into each end of the waveguide return with an intensity dependent relative phase shift after travelling around the waveguide.

In contrast to the known device described above, the present invention makes use of an optical waveguide including a material having a non-linear refractive index. This not only enables previously encountered alignment and diffraction problems to be avoided, but furthermore provides more flexibility in operation and avoids the constructional limitations of the earlier device. Further, the present device does not require cross-interaction between counter propagating fields, nor the establishment of an interference grating. Thus, in contrast to the device of Otsuka, the present device enables an intensity dependent relative phase shift to be achieved where the duration of an input signal is shorter than the signal transit time through the non-linear medium or material. The non-linear material may also be conveniently distributed throughout the waveguide.

In the present device the appropriate waveguide parameters, the coupling ratio, or a combination of both may be selected to break the device symmetry and so obtain a relative phase shift in the counter propagating portions as will be further described below. Thus, for example, the coupling ratio may be symmetric (50:50), in contrast to the Otsuka device where it is essential for the beamsplitter to be assymmetric (i.e. other than 50:50) as the optical path in his device is otherwise symmetric.

The waveguide parameters which may be appropriately selected to affect the device symmetry include, for example, the waveguide length, the non-linear refractive index $n_2$ (Kerr co-efficient), the dispersion $k_2$, the mode field width, and the like. These parameters may be allowed to vary along the length of the waveguide.

In this specification by "non-linear" we mean that the refractive index of the material varies with the intensity of the transmitted signal. Typically, the refractive index n is given by the formula:

$$n = n_0 + n_2 |E|^2$$

where $n_0$ is the linear refractive index, $n_2$ is the Kerr co-efficient and $|E|^2$ is the intensity of the transmitted signal.

In one preferred arrangement the coupling means has a coupling ratio of other than 50:50 (i.e.. the intensities of signal portions coupled into the ends of the waveguide are not equal). In this situation, signals with different intensities are fed in opposite directions around the waveguide thus resulting in the signals experiencing different refractive indices. As will be explained below, this results in the signals experiencing different phase shifts so that when the signals return back to the coupling means, they have an intensity dependent relative phase shift. By varying the coupling ratio and/or the length of the waveguide, for example, it is possible to vary the phase shift between the returning signals for any particular working intensity of input signal.

The intensity dependence of the relative phase shift results in a device whose output is an oscillatory function of the intensity of the input signal. This property can be used in a variety of applications including logic elements, optical amplifiers, optical switches and the like.

In another arrangement, the waveguide may further comprise a second material in series with the first material, the first and second materials having non-commuting effects on an optical signal at a working intensity travelling along the waveguide. In this situation, the coupling ratio of the coupling means could be 50:50 since the non-commuting materials can be arranged to automatically produce the required relative phase shift even in signal portions with the same input intensity. The second material is preferably a dispersive material. Conventionally, it is desirable to minimise dispersion effects, both by fabricating waveguides with low absolute dispersion and by operating at wavelengths around the dispersion zero for the waveguide. However, a waveguide according to the present invention can be fabricated with different dispersive properties at different portions. For example, differences in total dispersion can be achieved by varying the waveguide refractive index profile. According to the length of the waveguide portion comprising the second material, the dispersion must be adequate, in combination with an appropriate non-commuting property, to provide the asymmetry required to achieve the intensity dependent phase shift. Suitable combinations of non-commuting properties include, for example, dispersion and either (or both) of non-linearity $n_2$ and mode field width. Alternatively, for example, the second material may have non-linear polarisation rotation properties which do not commute with those mentioned above. Appropriate alternative combinations of these and other properties will be apparent to those skilled in the art.

It should be noted that where the waveguide comprises two or more serially connected portions with non-commuting properties then the order in which non-interacting, counter propagating signals pass through the portions becomes important and changing the order will generally result in a different phase change in the resultant signals arriving back at the coupling means.

Devices according to the invention are operable to produce an intensity dependent phase shift both when the duration of the counter propagating signals exceeds the transit time through the waveguide (when cross-interaction dominates) and when the signal duration is less than this transit time (when the cross-interaction is not significant). However, the operation of the device as discussed above assumes that the input signals are of substantially constant intensity over the time taken to propagate around the waveguide. For pulse signals this amounts to an assumption that the pulses are substantially square. As pulse duration decreases, however, this assumption is no longer valid for real pulses with finite rise and fall times which comprise a significant proportion of the overall pulse width. In these circumstances each pulse envelope will contain a number of cycles with a range of intensities. In silica, for example, since the non-linear refractive index responds to the instantaneous intensity, each cycle will experience a slightly different refractive index as it passes through the non-linear material which will generally result in a variation in phase shift between cycles in the same pulse which may degrade the basic device performance.

In a preferred embodiment of the present invention, to overcome or at least mitigate the potential problem which may be presented under these conditions, the waveguide comprises material which supports soliton effects when optical pulses at appropriate working intensities are injected into the device. The length of the waveguide must then be sufficient such that the intensity dependent phase of an injected pulse becomes substantially uniform throughout the pulse.

In this latter embodiment the properties of the waveguide are selected such that the Kerr coefficient, $n_2$, and the group velocity dispersion have opposite signs. Then, if the input is of sufficiently high intensity, the waveguide will support pulses which propagate substantially non-dispersively over several times the length over which a low intensity pulse would disperse. Such pulses are referred to as solitons. An article by N. J. Doran and K. J. Blow entitled "Solitons in Optical Communications", IEEE Journal of Quantum Electronics, Vol. QE19, No. 12, Dec. 1983 provides an appropriate discussion of soliton propagation. In the present specification and relevant claims "soliton" is taken to refer to any pulse which exhibits the above property of substantially non-dispersive propagation and not only to so-called "exact" or pure solitons, for example, as hereinafter described.

This preferred embodiment, therefore, specifically employs a waveguide with significant dispersion of the required form which permits soliton propagation.

For soliton pulses the overall phase changes are dependent on the intensity of the pulse envelope as a whole and not merely on the instantaneous intensities of different portions of the wave train as is the case with non-soliton pulses. For the intensity-dependent phase of a soliton pulse to be substantially uniform throughout the pulse, it has been found that solitons should propagate over a waveguide length at least approximately equivalent to a soliton period or more as described below.

As with the previous embodiments of the invention, to achieve a non-zero, intensity-dependent relative phase shift between the wave trains within the counter propagating pulse envelopes it is necessary to break the symmetry of the device in some appropriate manner. Conveniently, this may be done by using an asymmetric coupling means (not 50:50) or by having waveguide portions with different dispersions or non-linear coefficients $n_2$, for example. However, since the refractive index varies with $n_2 \times$ Intensity, an effective asymmetry may also be obtained by allowing the intensity in different portions of the waveguide to differ. This may be achieved, for example, by having different portions of the waveguide with differing mode field widths. Any combinations of these differences may also be used to achieve a desired asymmetry.

For soliton propagation, the waveguide preferably comprises material which simultaneously exhibits both the dispersive and non-linear properties as required for soliton propagation. Whilst it is possible to achieve soliton propagation under alternative conditions, for example, when the waveguide comprises an alternating sequence of dispersive and non-linear components, this is not particularly desirable for soliton propagation since, as noted above, in physical terms, the effects do not commute. Consequently, a large number of very short lengths of waveguide with the alternating properties would probably be required to achieve a reasonable approximation to the conditions for effective soliton propagation.

Preferably, the waveguide is a single mode waveguide. Conveniently, the optical waveguide is formed from optical fibre, preferably monomode optical fibre. Alternatively, for example, the waveguide may be fabricated in planar (e.g. lithium niobate) waveguide form.

Non-linear properties may be provided by appropriately doping the waveguide. It is also possible, for example, to introduce non-linear behaviour by providing suitable non-linear material as an overlay on a conventional waveguide. For instance, an optical fibre may have some cladding etched away sufficiently to allow coupling of its optical field into an external overlay of non-linear material without necessarily exposing or doping the fibre core. Similarly the dispersive properties may be provided by doping or other techniques. For example, a dispersive grating may be provided in the waveguide.

Also preferably the waveguide includes inherent polarisation control or is positioned in series with a polarisation controller. Where the waveguide exhibits birefringence, for example, polarisation control enables the input to be appropriately adjusted or maintained to provide consistent and predictable device performance.

According to another aspect of the present invention a method of processing an optical signal comprises the steps of:

providing a device according to the invention in its first aspect;

inputting an optical signal into a second port of the device to produce two counter propagating signals within the waveguide, thereby to provide a processed pulse signal output at least at one of the second pair of ports.

Preferably, the method comprises inputting an optical signal having a duration less than the transit time for propagation around the waveguide and of substantially constant input intensity.

The processing may be to perform logic functions on, to amplify, switch or otherwise modify an input signal. The processed signal output will correspondingly comprise a logical output, an amplified, switched or otherwise modified signal. Criteria and preferences for the selection of device parameters are as described above with reference to the invention in its first aspect.

Alternatively, or additionally, for processing an optical signal comprising pulses capable of soliton propagation the method comprises the steps of:

providing a device according to the invention in its first aspect including a waveguide whose parameters are selected for soliton propagation;

inputting a pulse signal into a second port of the device, at an amplitude appropriate for soliton propagation in the waveguide, thereby to produce two counter propagating signals within the waveguide and to provide a processed pulse signal output at least at one of the second pair of ports.

The device parameters are selected appropriately to influence the soliton propagation according to the processing required.

BRIEF DESCRIPTION OF THE DRAWINGS

Embodiments of an optical device and methods of operation according to the invention will now be described by way of example and with reference to the accompanying drawings, in which.

DETAILED DESCRIPTION

Figure 1:
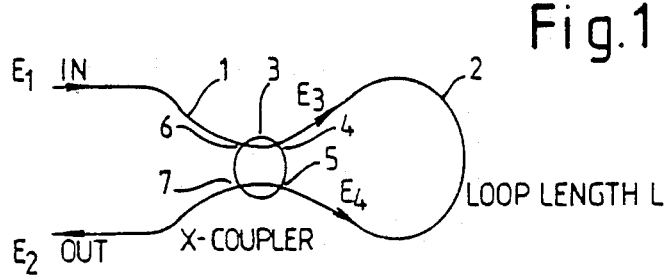
FIG. 1 is a schematic diagram of a device.

The optical device shown in FIG. 1 is defined by a single silica optical fibre 1 formed into a loop 2. Portions of the optical fibre itself are positioned close to one another to define an X coupler 3 having a first pair of ports 4, 5 and a second pair of ports 6, 7. The X coupler 3 is adapted to couple portions of an optical signal received at the ports 6 or 7 into each of the ports 4, 5 in accordance with a predetermined coupling ratio. Similarly, optical signals arriving at the coupler 3 received by either the port 4 or port 5 will be coupled by the same coupling ratio into the ports 6, 7.

Thus, under normal (linear) circumstances the device shown in FIG. 1 will operate as a mirror. That is with the input $E_1$ at the port 6, the light all returns back to the port 6 if the coupling ratio is 50:50. Any other value for the coupling ratio gives an appropriate split in the output power between the two ports 6, 7.

The coupler 3 causes a single input to be split into two counter propagating fields which return in coincidence to combine back at the coupler. The optical path length is precisely the same for both propagating fields since they follow the same path but in opposite directions. This is an important feature of the device. Linearly the fields will emerge the same independent of which way round they traverse the loop; non-linearly this may not be the case. Below, a situation is described in which non-linearity breaks the identical propagation effects for the two paths. The device described responds to differences in phases of combining fields and could therefore be described as an interferometric device but there is no need for interferometric alignment of the optical paths. This is an outstanding feature of the device.

The loop 2 of the waveguide is formed at least partly from a non-linear material exhibiting a refractive index n which varies in accordance with the formula given above. The device operates in the 'small' non-linearity regime which means that it is only the phase that is altered and there are, for example, no effects on the group velocity. In the small non-linearity regime, $n_0$ is much greater than $n_2|E|^2$ (e.g. may be by a factor of about $10^6$). The simplest realization of a non-linear device based on the configuration of FIG. 1 is to allow self-phase-modulation (SPM) in the fibre loop with a coupler 3 with coupling ratio $\alpha:(1-\alpha)$ SPM gives a distance and intensity dependent phase shift given by $$\phi(E) = (2\pi n_2 |E|^2 L)/\lambda \, \text{rad}$$

where $n_2$ is the nonlinear Kerr coefficient.

The coupler equations for an 'X' coupler as in FIG. 1 are:

$$E_3 = \alpha^{0.5} E_1 + i(1-\alpha)^{0.5} E_2 \qquad (1)$$

$$E_4 = i(1-\alpha)^{0.5} E_1 + \alpha^{0.5} E_2 \qquad (2)$$

with $\alpha$ the coupling coefficient (e.g. for a 50:50 coupler $\alpha = 0.5$, for a 60:40 coupler $\alpha = 0.4$).

We take the case of a single input at port 6, $E_{IN}$. Therefore:

$$E_3 = \alpha^{0.5} E_{IN}$$

$$E_4 = i(1-\alpha)^{0.5} E_{IN}$$

Thus after travelling the distance L $$E_3 = \alpha^{0.5} E_{IN} \exp i[\alpha 2\pi n_2 |E_{IN}|^2 L/\lambda_2]$$

$$E_4 = i(1-\alpha)^{0.5} E_{IN} \exp i[(1-\alpha) 2\pi n_2 |E_{IN}|^2 L/\lambda]$$

For the return transit through the coupler 3 we need the transform of equation 1, i.e.:

$$E_1 = \alpha^{0.5} E_3 - i(131\alpha)^{0.5} E_4$$

$$E_2 = i(1-\alpha)^{0.5} E_3 + \alpha^{0.5} E_4$$

To calculate the output at 6 and 7 we need to substitute and $E_4 = E_3^*$ and $E_3 = E_4^*$ and obtain:

$$E_1 = -i\alpha^{0.5}(1-\alpha)^{0.5} E_{IN}[\exp-i((1-\alpha)\phi(E_{IN})) + -i(\alpha\phi(E_{IN}))]$$

$$E_2 E_{IN}[\alpha \exp-i(\alpha\phi(E_{IN})) - 1 - \alpha)\exp-i((1-\alpha)\phi(E_{IN}))]$$

The output intensities are given by:

$$|E_1|^2 = |E_{IN}|^2 2\alpha(1-\alpha)[1+\cos((1-2\alpha)\phi(E_{IN}))]$$

$$|E_2|^2 = |E_{IN}|^2[1-2\alpha(1-\alpha)(1+\cos((1-2\alpha\phi(E_{IN})))]$$

These equations show that for any value of $\alpha$, 100% of the power emerges from port 7 when:

$$\phi(E) = \pi(1-2\alpha)m$$

and the minimum output power from port 7 is when:

$$\phi(E) = 2\pi(1-2\alpha)m,$$

where m is an integer; in which case:

$$|E_2|^2 = 1 - 4\alpha(1-\alpha)$$

which is the output for linear fields.

Figure 2:
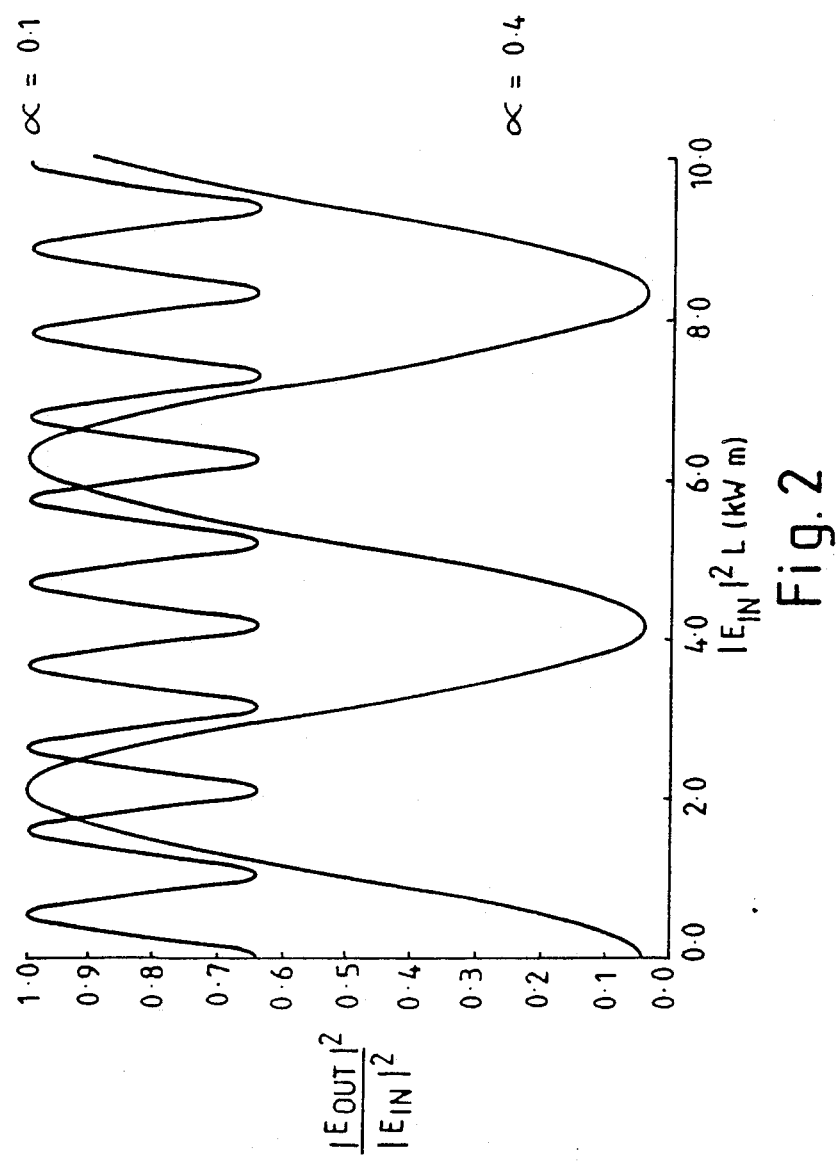
FIG. 2 illustrates graphically the variation between input intensity and output intensity (after normalisation) for two different coupling ratios.

The general behaviour (or response characteristic) is shown in FIG. 2. The output switches from the low power value to 100% every time the power increases by $$\Delta |E|^2 = \frac{\pi}{(1-2\alpha)} \times \frac{\lambda}{n_2 2\pi L}$$

The best switching ratio occurs for $\alpha$ close to 0.5 but the switching energy increases correspondingly. In the limit, for a 50:50 coupler ($\alpha = 0.5$) the required field would be infinite.

For one shift from minimum to maximum output we require:

$$|E|^2 L = \frac{\pi}{(1-2\alpha)} \times \frac{\lambda}{n_2^2 \pi}$$

For silica based fibres $n_2 = 3.2 \times 10^{-16}$ cm$^2$/Wm, and taking $\lambda = 106$ μm and fibre area 100 μm$^2$ then:

$$|E|^2 L = \frac{\pi}{(1-2\alpha)} \times 5 \times 10^2$$

For the example of $\alpha = 0.4$ then we need $E^2 = 8$ kw for L=1 m. If $\alpha = 0.1$ then the required peak power comes down to 1.9 kw but the switching contrast is correspondingly reduced as shown in FIG. 2.

The above calculations are effectively for constant intensity operation and do not treat the case where dispersion is significant. A single value has been taken for the input intensity in order to derive the output results. In reality, unless the input can be considered as square pulses, the transmission characteristic will be degraded by the varying signal intensity. Since the basic device response is just to the instantaneous intensity, the basic device would not work as efficiently on shorter pulses where the variation in intensity throughout the pulse duration becomes significant.

It is then desirable to modify the device to provide significant dispersion as well as SPM in the waveguide and introduce soliton propagation effects.

Solitons are generated by the combined action of self-phase modulation and dispersion in the negative group velocity dispersion regime in an optical waveguide. The use of solitons in a non-linear optical device is also discussed in copending patent application GB No. 8625281 filed 22.10.86 in the name of the present applicants.

An exact single soliton does not change shape in its propagation through an optical waveguide, but it does acquire a phase shift proportional to the distance travelled. Even if the pulse is not an exact soliton the effects of dispersion and non-linearity can be approximately balanced, and a pulse whose amplitude and shape is close to an exact soliton does not change significantly on propagation.

The propagation of pulse envelopes u(z,t) in a waveguide with negative group velocity dispersion and including non-linearity is described by the dimensionless Non-linear Schrodinger equation (NLS):

$$iu_z + U_{tt}/2 + u|u|^2 = 0$$

where the subscripts imply partial differentials. The requirement for negative group velocity dispersion determines the positive sign of the $|u|^2$ term in the NLS. This is a normalised equation and there are transformations to convert the dimensionless quantities back to real units (see e.g. Doran and Blow op. cit.). Here it is sufficient to point out that the normalised amplitude generated by a real pulse is proportional to $(n_2/k_2)^{\frac{1}{2}}$ and the normalised distance, z is proportional to $k_2/T^2 L$, where $k_2$ is the dispersion coefficient, T is the pulse duration and L is the real distance. The NLS has exact soliton solutions of the initial form $$u(z=0,t) = N\text{sech}(t)$$

with N integer. For all N(integer) the solitons have the property that the modulus of u (and thus the shape of the pulse envelope) returns to its original form every $\pi/2$ propagated (i.e. the soliton period is $\pi/2$). For N=1 the full solution is $$u(z,t) = \exp(iz/2)\text{sech}(t)$$

It is important to note in the above formula the phase factor $\exp(iz/2)$. This is an overall phase which is present in all solitons. That is for all solitons the solution can be written $$u(z,t) = \exp(iz/2)f(z,t)$$

where f(z,t) is periodic in z with period $\pi/2$. It is this property of solitons which can be exploited in an embodiment of the present invention adapted to allow soliton propagation.

From numerical solutions of the propagation problem the present inventors have found that pulses in the soliton regime but whose amplitudes do not correspond to that of exact solitons acquire an overall phase shift proportional to the distance travelled. This phase rotation is approximately uniform throughout the intensity envelope, and increases with peak amplitude. If the pulse amplitude in a device according to the invention is sufficient to produce these 'soliton' effects, then good switching is still possible for entire pulses.

For a given dispersion, the length of the waveguide must then be sufficient to provide for communication between the different intensity cycles within a pulse, such that the intensity dependent phase of an injected pulse becomes substantially uniform throughout the pulse.

As a soliton pulse propagates in a waveguide, cycles of the wave train within the pulse envelope which defines the soliton undergo intensity-dependent phase changes. After some distance of propagation the intensity-dependent phase is essentially uniform throughout the wave train forming the soliton. Thus overall phase changes are dependent on the intensity of the pulse envelope as a whole and not merely on the instantaneous intensities of different portions of the wave train as is the case with non-soliton pulses. For the intensity-dependent phase of a soliton pulse to be substantially uniform throughout the pulse it has been found that solitons should propagate over a waveguide length at least approximately equivalent to a soliton period or more.

Figure 3:
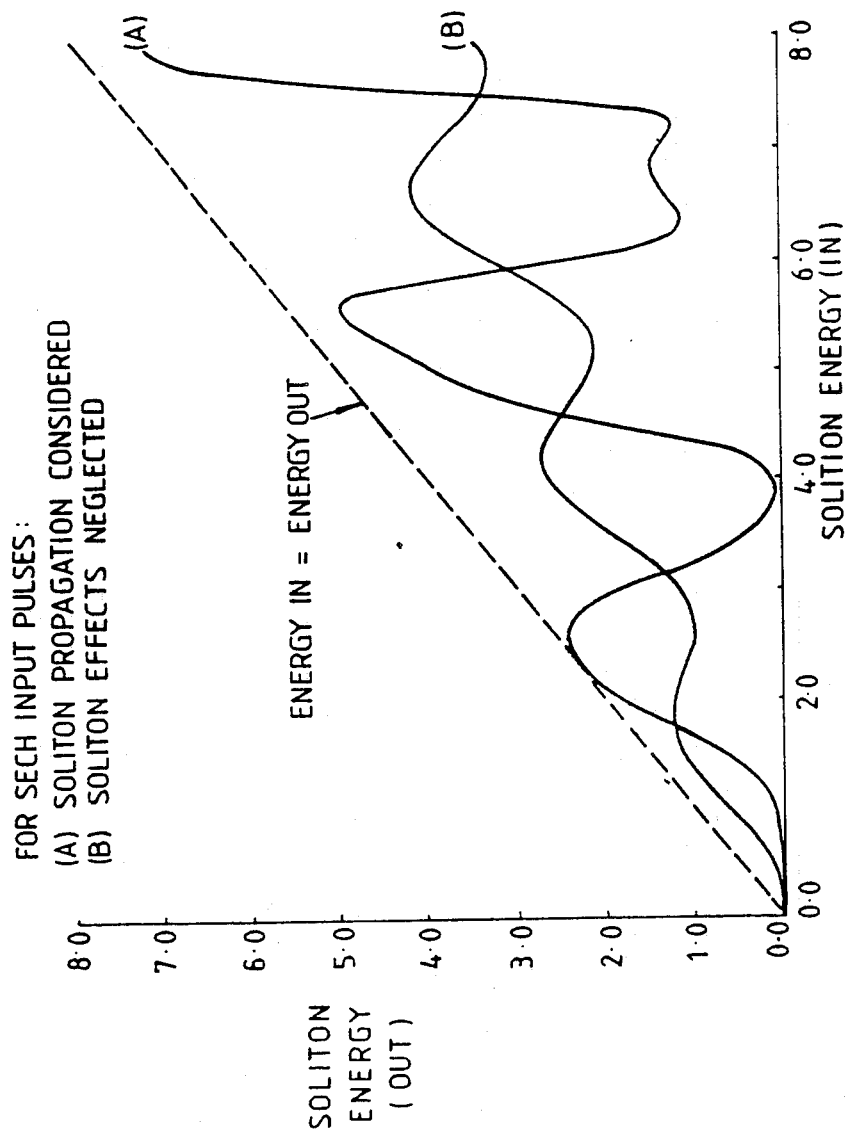
FIG. 3 is a graph illustrating the propagation characteristics of a device according to the invention for a pulse input.

FIG. 3 illustrates as an example the device characteristics for a waveguide formed of a loop of fibre with a length equivalent to four soliton periods. For a standard fibre at 1.55 $\mu$m, this is equal to about 100 m for a 1 ps pulse. The total output energy is shown as a function of input energy for a sech shaped input pulse. In these circumstances it can be seen that the switching characteristics are comparable to those illustrated in FIG. 2, but in this case entire pulses are switched.

For comparison, FIG. 3 also shows the result for the same input pulses for a device with a waveguide with insignificant dispersion such that there is no substantial interplay between dispersion and the non-linear refractive index to allow soliton propagation. Using a waveguide adapted to allow soliton effects, there is a very clear improvement in performance. The units of FIG. 3 are given in terms of the energy of a single soliton; the conversion to real energies depends on the assumed pulse duration. Typically, for a standard (i.e. not dispersion shifted) optical fibre with say an effective area of 30 $\mu$m$^2$ and taking $n_2 = 3.2 \times 10^{-16}$ cm$^2$/W, at $\lambda = 1.55$ $\mu$m, then a 7 ps soliton will have an energy of around 2 pJ. For a 1 ps soliton this increases to around 15 pJ with a corresponding reduction required in the loop length.

Thus if the device is adapted to operate in the soliton regime, then excellent switching characteristics can be obtained for entire 'bell-shaped' pulses. Generally, it will be necessary for the loop to be of sufficient length for dispersion to take effect, which in practice means around one or more soliton periods. The loop length actually required reduces as the square of the pulse duration. Thus for subpicosecond switching, a loop of only a few meters of fibre would be required.

The device may also be fabricated in planar (e.g. LiNbO$_3$) waveguide form. The appropriate dispersion effects may be obtained, for example, by means of imposing a grating in the basic loop.

It should be noted that in devices here dispersion is not significant (e.g. where soliton propagation is not especially desirable), there is no necessity for the non-linear material to be evenly distributed throughout the waveguide forming the loop. The device operation is then substantially insensitive to the positioning of the non-linearity within the loop, and therefore equivalent effects can be obtained, for example, by inserting a short, more highly non-linear element anywhere in a loop of otherwise standard optical fibre.

Figure 4:
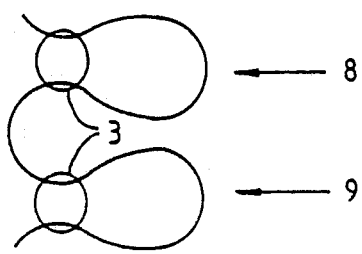
FIG. 4 illustrates a series of devices coupled together.

The device described above may be concatenated as shown in FIG. 4 to improve the switching contrast. FIG. 4 illustrates two devices 8, 9 coupled together in series. Unlike alternative Mach-Zehnder based devices there is no need to arrange for phase shift similarity for consecutive elements in the concatenation since there is no phase shift parameter. Interferometric alignment is guaranteed in the present devices.

The symmetry can be broken for the 50:50 coupler situation without the need for infinite fields as is the case in the simple device described above. To do this, for example, it is necessary to have at least two types of fibre arranged in series within the loop 2 of FIG. 1. In general, where there is non-linearity, propagation in a first type of fibre followed by propagation in the second type will not result in the same output as propagation in the second type of fibre followed by propagation in the first. This is the principle to be exploited. For example, the first type of fibre could be selected to have a dispersion zero at the operating wavelength, in which case propagation would be by SPM, whilst the second fibre type could be selected to be highly dispersive at the operating wavelength such that propagation would be substantially pure dispersion. These two effects do not commute.

Symmetry breaking may generally be expected to require dispersion effects and therefore this type of configuration is appropriate for optimisation of logic operation for pulses. The device could operate in the soliton regime and give good switching for whole pulses without the need for interferometric alignment. Other combinations of non-commuting effects including non-linear polarisation rotation and mode field width, for example, may also be used.

Figure 5:
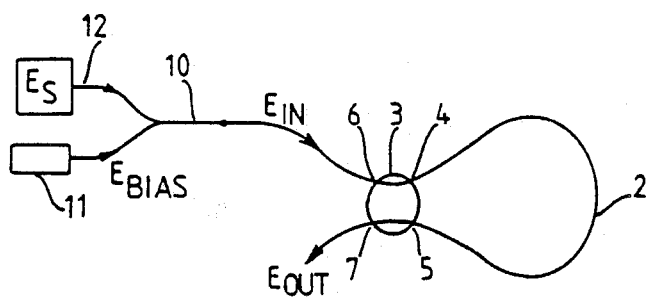
FIGS. 5 and 6 show devices according to the invention in further configurations.

The basic device shown in FIG. 1 can be utilised in a number of applications. For example, the device can be fabricated as an amplifier by biasing the input port 6 to a position towards the bottom of one of the curves shown in FIG. 2. As shown in FIG. 5, this may be achieved by the addition of a Y coupler 10 to the basic device. One input arm of the Y coupler 10 is coupled with a laser 11 which generates a bias optical signal E$_{BIAS}$ and the other input arm 12 is coupled with a source of optical signals E$_S$. If the device is biased at a position near the base of a steeply sloping portion of the appropriate characteristic curve then a small input signal E$_S$ fed along the other arm 12 of the Y coupler will cause a signal with a significantly increased intensity to be output from the port 7.

Figure 6:
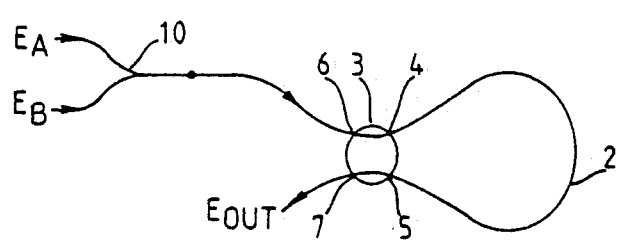

The device can also be used as a logic element, for example an EXOR gate. A simple two input EXOR gate configuration is shown in FIG. 6. In this case, a Y coupler 10 is again provided with its output coupled with the port 6 and with both its input arms coupled with respective signal sources $E_A$ and $E_B$. With the input logic levels selected such that a LOW input coincides with an intensity $E_{IN}$ corresponding to a minimum in the response characteristic (FIG. 2. and with the difference between a LOW and a HIGH chosen to provide a change in intensity sufficient to move to a maximum in the response characteristic, a high output $E_{OUT}$ at the port 7 will only be generated when the one or the other, but not both, of the two input signals is HIGH.

Other configurations employing embodiments of the present invention will be apparent to those skilled in the art. For example, a suitably calibrated device according to the invention may be used for the determination of the unknown $n_2$ of a material inserted in the waveguide loop by measuring the phase shift for a given intensity input.

What is claimed:

1. An optical device comprising a coupling means having first and second pairs of optical communication ports, in which portions of an optical signal received at a port of one pair are coupled into each port of the other pair in a predetermined coupling ratio; and an optical waveguide including a first material having a non-linear refractive index, and a second material in series with the first material, the first and second materials having non-commuting effects on an optical signal at a working intensity travelling along the waveguide, the optical waveguide coupling together the first pair of ports; the coupling ratio and appropriate waveguide parameters being selected such that in use the portions of an optical signal at a working intensity received at one of the second pair of ports of the coupling means, and coupled into each end of the waveguide, return to said coupling means with an intensity dependent relative phase shift after travelling around the waveguide.

2. A device according to claim 1, wherein the coupling ratio of the coupling means is other than 50:50.

3. An optical device according to claim 1 further including additional coupling means having a pair of input ports and an output port coupled to one of said second pair of ports such that said optical device may be used as an optical logic gate.

4. A device according to claim 1, where the second material is relatively more dispersive than the first material.

5. A device according to claim 1, wherein the optical waveguide is formed from a single optical fibre.

6. An optical device according to claim 1 wherein the waveguide comprises material which supports soliton effects when optical pulses at appropriate working intensities are injected into the device, the length of the waveguide being sufficient such that the intensity dependent phase of an injected pulse is substantially uniform throughout the pulse after propagation through the waveguide.

7. An optical device according to claim 1 wherein the non-linear material is provided as an overlay on a portion of the waveguide.

8. An optical amplifier including an optical device according to claim 1; additional coupling means having a pair of input ports and an output port optically coupled with one of the second pair of ports of the one coupling means; and a bias signal source coupled with one of the input ports of the additional coupling means.

9. A method of processing an optical signal comprising the steps of:

providing an optical device having a coupling means having first and second pairs of optical communication ports, in which portions of an optical signal received at a port of one pair are coupled into each port of the other pair in a predetermined coupling ratio; and an optical waveguide at least a portion of which includes a first material having a non-linear refractive index, and a second material in series with said first material, the first and second materials having non-commuting effects on an optical signal at a working intensity travelling along the waveguide the optical waveguide coupling together the first pair of ports; the coupling ratio and appropriate waveguide parameters being selected such that in use the portions of an optical signal at a working intensity received at one of the second pair of ports of the coupling means, and coupled into each end of the waveguide, return to said coupling means with an intensity dependent relative phase shift after travelling around the waveguide; and inputting an optical signal into one of the second pair of ports of the device to produce two counter propagating signals within the waveguide, thereby to provide a processed pulse signal output at least at one of the second pair of ports.

10. A method according to claim 9 comprising inputting an optical signal having a duration less than the transit time for propagation around the waveguide.

11. A method according to claim 9 for processing an optical signal comprising pulses capable of soliton propagation comprising the steps of:

selecting parameters for the waveguide of said optical device which are appropriate for soliton propagation;

inputting a pulse signal into one of the second pair of ports of the device, at an amplitude appropriate for soliton propagation in the waveguide, thereby to produce two counter propagating signals within the waveguide and to provide a processed pulse signal output at least at one of the second pair of ports.

12. An optical device comprising:

a coupling means having first and second pairs of optical communication ports, in which portions of an optical signal received at a port of one pair are coupled into each port of the other pair in a predetermined coupling ratio; and an optical waveguide comprising material which supports soliton effects when optical pulses at appropriate working intensities are injected into the device, the length of the waveguide being sufficient such that the intensity dependent phase of an injected pulse is substantially uniform throughout the pulse after propagation through the waveguide, at least a portion of such waveguide including a first material having a non-linear refractive index, the optical waveguide coupling together the first pair of ports; the coupling ratio and appropriate waveguide parameters being selected such that in use the portions of an optical signal at a working intensity received at one of the second pair of ports of the coupling means and coupled into each end of the waveguide return with an intensity depending relative phase shift after travelling around the waveguide.

13. An optical amplifier including an optical device comprising:

a coupling means having first and second pairs of optical communication ports, in which portions of an optical signal received at a port of one pair are coupled into each port of the other pair in a predetermined coupling ratio; and an optical waveguide at least a portion of which includes a first material having a non-linear refractive index, the optical waveguide coupling together the first pair of ports, the coupling ratio and appropriate waveguide parameters being selected such that in use the portions of an optical signal at a working intensity received at one of the second pair of ports of the coupling means and coupled into each end of the waveguide return with an intensity dependent relative phase shift after travelling around the waveguide;

additional coupling means having a pair of input ports and an output port optically coupled with one of the second pair of ports of the one coupling means; and a bias signal source coupled with one of the input ports of the additional coupling means.

14. An optical logic gate including an optical device comprising:

a coupling means having first and second pairs of optical communication ports, in which portions of an optical signal received at a port of one pair are coupled into each port of the other pair in a predetermined coupling ratio; and an optical waveguide at least a portion of which includes a first material having a non-linear refractive index, the optical waveguide coupling together the first pair of ports; the coupling ratio and appropriate waveguide parameters being selected such that in use the portions of an optical signal at a working intensity received at one of the second pair of ports of the coupling means and coupled into each end of the waveguide return with an intensity dependent relative phase after travelling around the waveguide.

* * * * *